(12) United States Patent
Zhu et al.

(10) Patent No.: US 11,978,350 B2
(45) Date of Patent: May 7, 2024

(54) DATA ACQUISITION SYSTEM AND METHOD FOR AIRBORNE NAVIGATION DEVICES BASED ON UNMANNED AERIAL VEHICLE

(71) Applicant: BEIHANG UNIVERSITY, Beijing (CN)

(72) Inventors: Yanbo Zhu, Beijing (CN); Xiaofeng Shi, Beijing (CN); Zhipeng Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 331 days.

(21) Appl. No.: 17/677,296

(22) Filed: Feb. 22, 2022

(65) Prior Publication Data

US 2023/0096090 A1 Mar. 30, 2023

(30) Foreign Application Priority Data

Sep. 29, 2021 (CN) .......................... 202111149174.0

(51) Int. Cl.
| | |
|---|---|
| *G01S 19/02* | (2010.01) |
| *G01S 19/15* | (2010.01) |
| *G01S 19/23* | (2010.01) |
| *G01S 19/37* | (2010.01) |
| *G08G 5/00* | (2006.01) |

(52) U.S. Cl.
CPC ............ *G08G 5/0069* (2013.01); *G01S 19/02* (2013.01); *G01S 19/15* (2013.01); *G01S 19/23* (2013.01); *G01S 19/37* (2013.01); *G08G 5/0013* (2013.01)

(58) Field of Classification Search
CPC .......... G01S 19/02; G01S 19/15; G01S 19/23; G01S 19/37; G08G 5/0013
USPC .................................................... 342/357.395
See application file for complete search history.

(56) References Cited

U.S. PATENT DOCUMENTS

2019/0333395 A1* 10/2019 Borshchova .......... H04L 9/3247
2021/0233417 A1* 7/2021 Borshchova .......... G08G 5/0095

FOREIGN PATENT DOCUMENTS

CN 104750111 A * 7/2015

* cited by examiner

*Primary Examiner* — Harry K Liu
(74) *Attorney, Agent, or Firm* — Weiss & Moy, PC; Jeffrey D. Moy

(57) ABSTRACT

The present disclosure relates to a technical field for airborne navigation and discloses a data acquisition system and method for airborne navigation devices based on unmanned aerial vehicle. The system includes an unmanned aerial vehicle flight control system, a navigation devices test antenna array, a multi-channel signal processing module, a signal acquisition module, an ADS-B transmitting module, a GNSS receiver, a UHF data link receiver, a power module and a ground station. The unmanned aerial vehicle is equipped with corresponding modules to receive signals from ground navigation devices, perform corresponding processing and storage, and transmit data to the ground, at the same time, receive control instructions sent by the ground to complete corresponding monitoring, analysis and inspection.

5 Claims, 2 Drawing Sheets

DATA ACQUISITION SYSTEM AND METHOD FOR AIRBORNE NAVIGATION DEVICES BASED ON UNMANNED AERIAL VEHICLE

TECHNICAL FIELD

The present disclosure belongs to a technical field for airborne navigation and flight inspection, in particular to a data acquisition system and method for airborne navigation devices based on unmanned aerial vehicle.

BACKGROUND ART

Flight inspection refers to a use of a flight inspection aircraft equipped with special inspection devices in order to ensure flight safety, in accordance with relevant regulations of flight inspection, to check and evaluate the tolerance and the quality of the space signals of various navigation, radar, communications and other devices as well as flight procedures for entering and leaving the airport, and the process of issuing flight inspection reports based on results of inspections and evaluations. There are many kinds of devices used in airborne navigation. The flight inspection system needs to collect and process various navigation devices data to obtain the inspection data. At present, the flight inspection system carried by the inspection aircraft has a wide variety of loads, high price and complex process, which has high requirements for the reliability and safety of the inspection aircraft itself.

With the increasing number of domestic small and medium-sized airports, the demand for flight inspection is also increasing. Due to the limitation of inspection personnel and the number of available inspection aircraft, the existing manned flight inspection often can not carry out flight inspection for the airports with flight inspection needs in time, which affects the normal operation and use of the airport.

SUMMARY

The purpose of the present disclosure is to provide a data acquisition system and method for airborne navigation devices based on unmanned aerial vehicle, which has the advantages of reducing the cost of flight inspection, simplicity and flexibility and improving the efficiency of flight inspection.

In order to achieve the above purpose, the present disclosure provides the following scheme: a data acquisition system for airborne navigation devices based on unmanned aerial vehicle, including an unmanned aerial vehicle flight control system, a navigation equipment test antenna array, a multi-channel signal processing module, signal acquisition module, an ADS-B transmission module, a GNSS receiver, a UHF data link receiver, a power module and a ground station.

The navigation devices test antenna array is connected to the multi-channel signal processing module through a radio frequency cable; the multi-channel signal processing module is connected to the signal acquisition module through a ARINC429 bus; the signal acquisition module is connected to the unmanned aerial vehicle flight control system, and connected to the ADS-B transmitting module and the GNSS receiver through a RS232 bus; the ADS-B transmitting module is connected to the GNSS receiver through the RS232 bus, and the GNSS receiver is connected to the UHF data link receiver through the RS232 bus; the power module is respectively connected to the navigation devices test antenna array, the multi-channel signal processing module, the signal acquisition module, the ADS-B transmitting module and the GNSS receiver, and connected to the UHF data link receiver through a voltage conversion module.

The navigation devices test antenna array is configured to receive data of ground navigation devices; the multi-channel signal processing module is configured to process the navigation devices data received by the navigation devices test antenna array; the signal acquisition module is configured to receive and store the navigation devices data processed by the multi-channel signal processing module, send the data to the unmanned aerial vehicle flight control system, and receive multi-channel signal processing module switching instructions sent by the unmanned aerial vehicle flight control system; the ADS-B transmitting module receives positioning data sent by the GNSS receiver, broadcasts the positioning data in a form of ADS-B message, and sends the ADS-B message data to the data acquisition module; the UHF data link receiver is configured to receive differential positioning information sent by a ground differential station and send the differential positioning information to the GNSS receiver; the GNSS receiver is configured to receive satellite positioning information; the power module is provided by the unmanned aerial vehicle and is configured to supply power to connected devices.

The signal acquisition module collects the navigation devices data processed by the multi-channel signal processing module through a ARINC429 bus, and receives the ADS-B message data and the differential positioning data through the RS232 bus to form flight inspection data, on the one hand, the signal acquisition module backs up the flight inspection data, on the other hand, sends the flight inspection data to the unmanned aerial vehicle flight control system through Ethernet, and the unmanned aerial vehicle flight control system sends the flight inspection data to the ground station through a unmanned aerial vehicle data link; the ground station sends the multi-channel signal processing module switching instructions to the unmanned aerial vehicle flight control system, the unmanned aerial vehicle flight control system sends the multi-channel signal processing module switching instructions to the signal acquisition module through the RS422 bus, and the signal acquisition module sends the multi-channel signal processing module switching instructions to the multi-channel signal processing module through the ARINC429 bus to realize switching of the multi-channel signal processing module, so as to realize a flight inspection of different ground navigation devices; the GNSS receiver module outputs PPS (pulse per second) signals and connects to the multi-channel signal processing module and the signal acquisition module to ensure data synchronization and reduce data delay.

The system is provided with an aircraft wheel weight or landing gear detection, the ADS-B transmitting module is provided with a landing detection (ON GND) input interface, and an output of the aircraft wheel weight or landing gear landing detection is connected to the landing detection input interface of the ADS-B transmitting module to judge whether the aircraft lands.

The navigation devices test antenna array includes a VOR/LOC (heading) antenna, a GS (glide slope) antenna, a MKR (marker beacon) antenna, a DME (distance measurement equipment) antenna, a NDB (non-directional beacon) antenna, and an ADF (automatic directional finder) antenna.

The power module adopts a lithium battery, a reference voltage provided is 28V DC voltage, and the voltage conversion module is 28V to 5V.

The present disclosure further provides a data acquisition method for airborne navigation method based on unmanned aerial vehicle, which includes the following steps:

step 1: a multi-channel data processing module receives and processes navigation signals of ground navigation devices through a navigation devices test antenna array to obtain navigation devices data;

step 2: a signal acquisition module collects the navigation devices data, ADS-B data and differential positioning data to form flight inspection data, and backs up the flight inspection data;

step 3: the signal acquisition module sends the flight inspection data to a unmanned aerial vehicle flight control system at the same time, and the unmanned aerial vehicle flight control system sends the flight inspection data to a ground station through a unmanned aerial vehicle data link;

step 4: the ground station sends multi-channel signal processing module switching instructions to the unmanned aerial vehicle flight control system;

step 5: the unmanned aerial vehicle flight control system sends the multi-channel signal processing module switching instructions to the signal acquisition module, switching of the multi-channel signal processing module is realized through the signal acquisition module, and a flight inspection of different navigation devices is completed;

step 6: when the unmanned aerial vehicle lands, the ADS-B transmitting module detects an aircraft landing signal and broadcasts the aircraft landing signal through ADS-B message, and ground station personnel receive the aircraft landing signal and complete a flight inspection process.

Compared with the prior art, the beneficial effects of the present disclosure are:

The present disclosure proposes a data acquisition system and method for airborne navigation devices based on unmanned aerial vehicle, which avoids the flight inspection system carried by the inspection aircraft from carrying a wide variety of loads, expensive, complex processes, and high requirements for the reliability and safety of the flight aircraft itself, etc. and has the advantages of reducing the cost of flight inspection and improving the accuracy and efficiency of flight inspection. With the increasing number of domestic small and medium-sized airports, the demand for flight inspection is also increasing. Due to the limitation of inspection personnel and the number of available inspection aircraft, the existing maned flight inspection often can not carry out flight inspection for the airports with flight inspection needs in time, which affects the normal operation and use of the airport. The present disclosure is an effective supplement to the existing manned flight inspection and is also a development trend of flight inspection in the future.

DETAILED DESCRIPTION OF THE EMBODIMENTS

Embodiments of the technical scheme of the present disclosure are described in detail below in combination with the accompanying drawings. The following embodiments are only used to more clearly illustrate the technical scheme of the present disclosure, and therefore are only used as examples, and cannot be used to limit the protection scope of the present disclosure.

Figure 1:
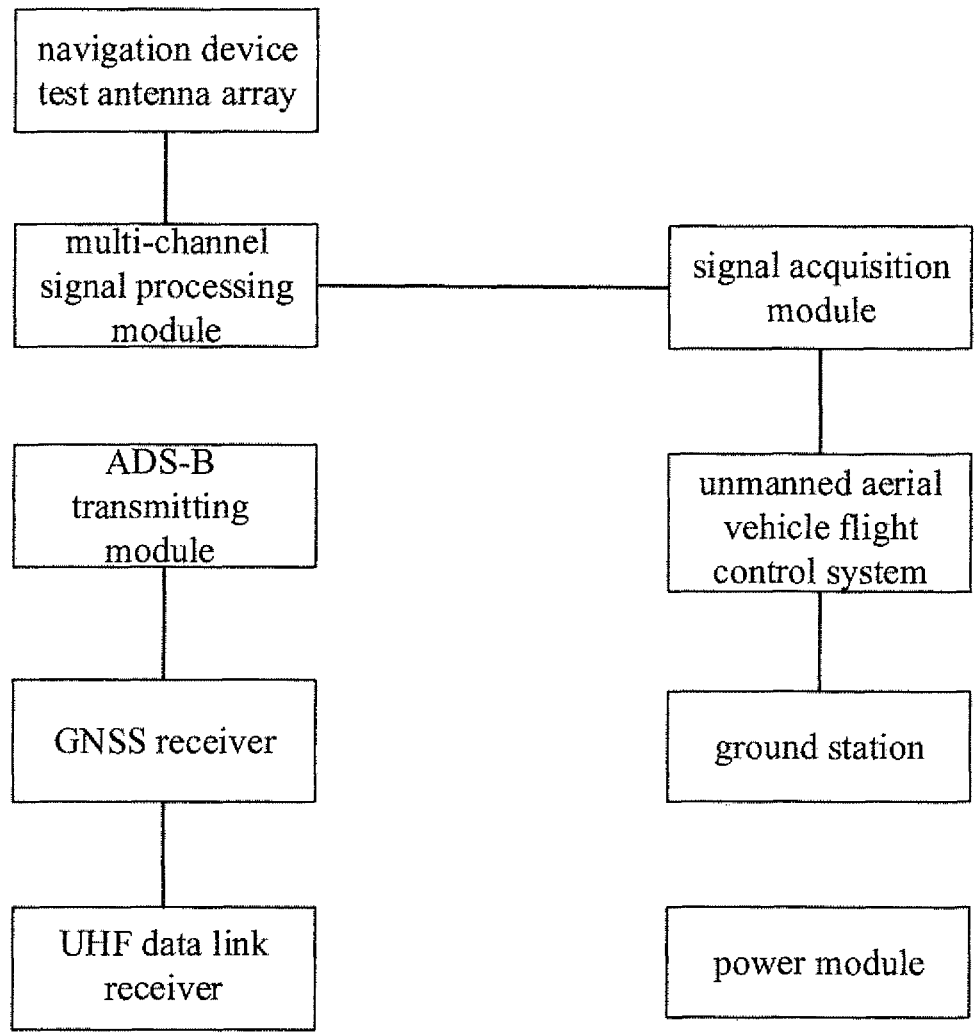
FIG. 1 is a structural block diagram of a data acquisition system for airborne navigation devices based on unmanned aerial vehicle in an embodiment of the present disclosure.

FIG. 1 is a data acquisition system for airborne navigation devices based on unmanned aerial vehicle in an embodiment of the present disclosure, as shown in FIG. 1, the airborne navigation devices based on unmanned aerial vehicle provided by the present disclosure, including a unmanned aerial vehicle flight control system, a navigation devices test antenna array, a multi-channel signal processing module, a signal acquisition module, a ADS-B transmitting module, a GNSS receiver, a UHF data link receiver, a power module and a ground station.

The navigation devices test antenna array is connected to the multi-channel signal processing module through a radio frequency cable; the multi-channel signal processing module is connected to the signal acquisition module through a ARINC429 bus; the signal acquisition module is connected to the unmanned aerial vehicle flight control system, and connected to the ADS-B transmitting module and the GNSS receiver through a RS232 bus; the ADS-B transmitting module is connected to the GNSS receiver through the RS232 bus, and the GNSS receiver is connected to the UHF data link receiver through the RS232 bus; the power module is respectively connected to the navigation devices test antenna array, the multi-channel signal processing module, the signal acquisition module, the ADS-B transmitting module and the GNSS receiver, and connected to the UHF data link receiver through a voltage conversion module.

The navigation devices test antenna array is configured to receive data of ground navigation devices; the multi-channel signal processing module is configured to process the navigation devices data received by the navigation devices test antenna array; the signal acquisition module is configured to receive and store the navigation devices data processed by the multi-channel signal processing module, send the data to the unmanned aerial vehicle flight control system, and receive multi-channel signal processing module switching instructions sent by the unmanned aerial vehicle flight control system; the ADS-B transmitting module receives positioning data sent by the GNSS receiver, broadcasts the positioning data in a form of ADS-B message, and sends the ADS-B message data to the data acquisition module; the UHF data link receiver is configured to receive differential positioning information sent by a ground differential station and send the differential positioning information to the GNSS receiver; the GNSS receiver is configured to receive satellite positioning information; the power module is provided by the unmanned aerial vehicle and is configured to supply power to connected devices.

The signal acquisition module collects the navigation devices data processed by the multi-channel signal processing module through a ARINC429 bus, and receives the ADS-B message data and the differential positioning data through the RS232 bus to form flight inspection data, on the one hand, the signal acquisition module backs up the flight inspection data, on the other hand, sends the flight inspection data to the unmanned aerial vehicle flight control system through Ethernet, and the unmanned aerial vehicle flight control system sends the flight inspection data to the ground station through a unmanned aerial vehicle data link; the ground station sends the multi-channel signal processing module switching instructions to the unmanned aerial vehicle flight control system, the unmanned aerial vehicle flight control system sends the multi-channel signal processing module switching instructions to the signal acquisition module through the RS422 bus, and the signal acquisition module sends the multi-channel signal processing module switching instructions to the multi-channel signal processing module through the ARINC429 bus to realize switching of the multi-channel signal processing module, so as to realize a flight inspection of different ground navigation devices; the GNSS receiver module outputs PPS (pulse per second) signals and connects to the multi-channel signal processing module and the signal acquisition module to ensure data synchronization and reduce data delay.

The system is provided with an aircraft wheel weight or landing gear detection, the ADS-B transmitting module is provided with a landing detection (ON GND) input interface, and an output of the aircraft wheel weight or landing gear landing detection is connected to the landing detection input interface of the ADS-B transmitting module to judge whether the aircraft lands.

Figure 2:
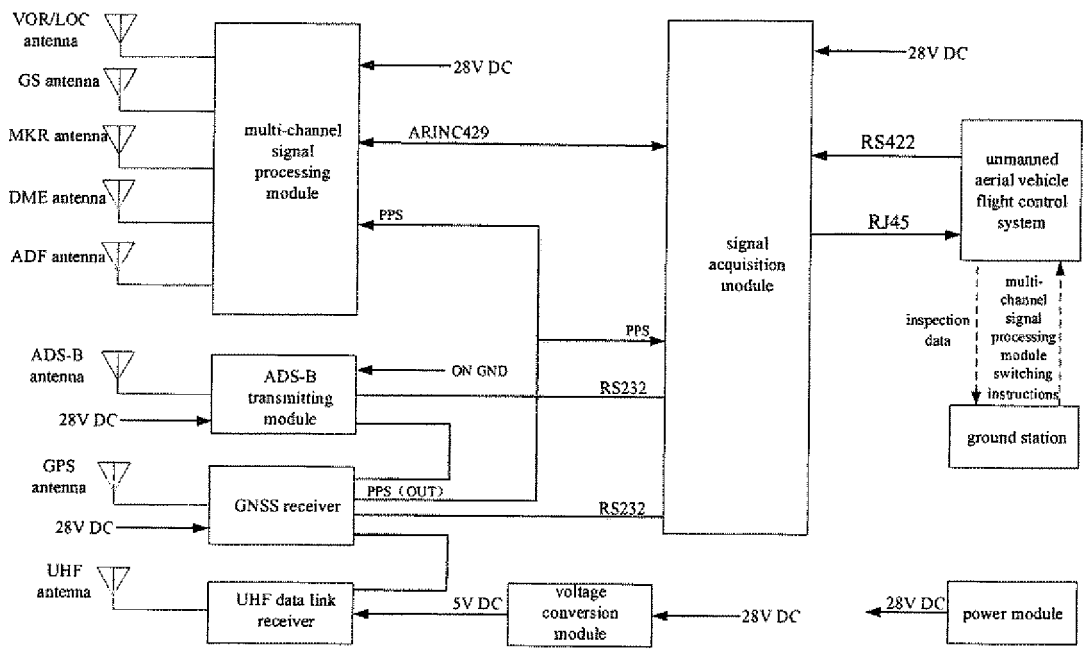
FIG. 2 is a schematic diagram of a data acquisition system for airborne navigation devices based on unmanned aerial vehicle in an embodiment of the present disclosure.

A schematic diagram of the data acquisition system for airborne navigation devices based on unmanned aerial vehicle is shown in FIG. 2, the navigation devices test antenna array includes a VOR/LOC (heading) antenna, a GS (glide slope) antenna, a MKR (marker beacon) antenna, a DME (distance measurement equipment) antenna, a NDB (non-directional beacon) antenna, and a ADF (automatic directional finder) antenna, which are configured to receive different navigation devices data on the ground, appropriate installation position of the antennas is selected according to a receiving frequency and signal strength.

The signal acquisition module collects the navigation devices data processed by the multi-channel signal processing module through the ARINC429 bus, and collects the ADS-B data and differential positioning data through the RS232 bus to form flight inspection data. Due to the different lengths and rates of various data, in order to ensure clock synchronization of various data, the GNSS receiver module outputs PPS (pulse per second) signal and connects the multi-channel signal processing module and signal acquisition module to ensure the synchronization of data and reduce data delay.

In the current flight inspection process of manned aircraft, the flight inspection data is directly transmitted to a flight inspection operator by wire, and the flight inspection operator can view the inspection data in real time. The biggest difference of unmanned aerial vehicle flight inspection is that the inspection data needs to be sent to the ground station through the data link. The flight inspection operator receives and checks the inspection data at the ground station. When a telemetry distance is too long, there will be corresponding packet loss and bit error when sent through the data link. Therefore, in order to ensure the accuracy and real-time performance of the data, on the one hand, the signal acquisition module backs up the flight inspection data, on the other hand, the flight inspection data is sent to the unmanned aerial vehicle flight control system through Ethernet and sent to the ground station through the unmanned aerial vehicle data link. The ground station sends the multi-channel signal processing module switching instructions to the unmanned aerial vehicle flight control system, the unmanned aerial vehicle flight control system sends the multi-channel signal processing module switching instructions to the signal acquisition module through the RS422 bus, and the signal acquisition module sends the multi-channel signal processing module switching instructions to the multi-channel signal processing module through the ARINC429 bus to switch the multi-channel signal processing module, so as to realize the flight inspection of different ground navigation devices.

The system is provided with unmanned aerial vehicle wheel weight or landing gear landing detection, and the detection data is switching value to judge the unmanned aerial vehicle flight or landing status. The ADS-B transmitting module is provided with a landing (on GND) detection input interface, and the unmanned aerial vehicle wheel weight or landing gear landing detection output is connected to the landing detection input interface of ADS-B transmitting module. When the unmanned aerial vehicle lands, the ADS-B transmitting module receives the landing signal and broadcasts the landing signal through ADS-B message. The ground station personnel receive the landing signal, complete the flight inspection process, and improve the standardization and safety of the flight inspection program.

The power module adopts a lithium battery, and a reference voltage provided is 28V DC voltage. Because the voltage required for UHF data link receiver is low, it is connected to the UHF data link receiver after voltage reduction through the voltage conversion module, and the voltage conversion module is 28V to 5V.

The present disclosure further provides a method applied to data acquisition system for airborne navigation devices based on unmanned aerial vehicle. The method includes the following steps:

step 1: a multi-channel data processing module receives and processes navigation signals of ground navigation devices through a navigation devices test antenna array to obtain navigation devices data;

step 2: a signal acquisition module collects the navigation devices data, ADS-B data and differential positioning data to form flight inspection data, and backs up the flight inspection data;

step 3: the signal acquisition module sends the flight inspection data to a unmanned aerial vehicle flight control system at the same time, and the unmanned aerial vehicle flight control system sends the flight inspection data to a ground station through a unmanned aerial vehicle data link;

step 4: the ground station sends multi-channel signal processing module switching instructions to the unmanned aerial vehicle flight control system;

step 5: the unmanned aerial vehicle flight control system sends the multi-channel signal processing module switching instructions to the signal acquisition module, switching of the multi-channel signal processing module is realized through the signal acquisition module, and a flight inspection of different navigation devices is completed;

step 6: when the unmanned aerial vehicle lands, the ADS-B transmitting module detects an aircraft landing signal and broadcasts the aircraft landing signal through ADS-B message, and ground station personnel receive the aircraft landing signal and complete a flight inspection process.

In the present disclosure, a specific example is applied to explain the principle and embodiment of the present disclosure. The description of the above embodiments are only used to help understand the method and core idea of the present disclosure; meanwhile, for those skilled in the art, there will be changes in the specific implementation mode and application scope according to the idea of the present disclosure. In conclusion, the contents of this specification shall not be construed as limiting the present disclosure.

What is claimed is:

1. A data acquisition system for airborne navigation devices based on unmanned aerial vehicle, comprising an unmanned aerial vehicle flight control system, a navigation devices test antenna array, a multi-channel signal processing module, a signal acquisition module, an ADS-B transmitting module, a GNSS receiver, a UHF data link receiver, a power module and a ground station; wherein the navigation devices test antenna array is connected to the multi-channel signal processing module through a radio frequency cable; the multi-channel signal processing module is connected to the signal acquisition module through a ARINC429 bus; the signal acquisition module is connected to the unmanned aerial vehicle flight control system, and connected to the ADS-B transmitting module and the GNSS receiver through a RS232 bus; the ADS-B transmitting module is connected to the GNSS receiver through the RS232 bus, and the GNSS receiver is connected to the UHF data link receiver through the RS232 bus; the power module is respectively connected to the navigation devices test antenna array, the multi-channel signal processing module, the signal acquisition module, the ADS-B transmitting module and the GNSS receiver, and connected to the UHF data link receiver through a voltage conversion module;

the navigation devices test antenna array is configured to receive data of ground navigation devices; the multi-channel signal processing module is configured to process the navigation devices data received by the navigation devices test antenna array; the signal acquisition module is configured to receive and store the navigation devices data processed by the multi-channel signal processing module, send the data to the unmanned aerial vehicle flight control system, and receive multi-channel signal processing module switching instructions sent by the unmanned aerial vehicle flight control system; the ADS-B transmitting module receives positioning data sent by the GNSS receiver, broadcasts the positioning data in a form of ADS-B message, and sends the ADS-B message data to the data acquisition module; the UHF data link receiver is configured to receive differential positioning information sent by a ground differential station and send the differential positioning information to the GNSS receiver; the GNSS receiver is configured to receive satellite positioning information; the power module is provided by the unmanned aerial vehicle and is configured to supply power to connected devices;

the signal acquisition module collects the navigation devices data processed by the multi-channel signal processing module through a ARINC429 bus, and receives the ADS-B message data and the differential positioning data through the RS232 bus to form flight inspection data, on the one hand, the signal acquisition module backs up the flight inspection data, on the other hand, sends the flight inspection data to the unmanned aerial vehicle flight control system through Ethernet, and the unmanned aerial vehicle flight control system sends the flight inspection data to the ground station through a unmanned aerial vehicle data link; the ground station sends the multi-channel signal processing module switching instructions to the unmanned aerial vehicle flight control system, the unmanned aerial vehicle flight control system sends the multi-channel signal processing module switching instructions to the signal acquisition module through the RS422 bus, and the signal acquisition module sends the multi-channel signal processing module switching instructions to the multi-channel signal processing module through the ARINC429 bus to realize switching of the multi-channel signal processing module, so as to realize a flight inspection of different ground navigation devices; the GNSS receiver module outputs PPS (pulse per second) signals and connects to the multi-channel signal processing module and the signal acquisition module to ensure data synchronization and reduce data delay.

2. The data acquisition system for airborne navigation devices based on unmanned aerial vehicle according to claim 1, wherein the system is provided with an aircraft wheel weight or landing gear detection, the ADS-B transmitting module is provided with a landing detection (ON GND) input interface, and an output of the aircraft wheel weight or landing gear landing detection is connected to the landing detection input interface of the ADS-B transmitting module to judge whether the aircraft lands.

3. The data acquisition system for airborne navigation devices based on unmanned aerial vehicle according to claim 1, wherein the navigation devices test antenna array comprises a VOR/LOC (heading) antenna, a GS (glide slope) antenna, a MKR (marker beacon) antenna, a DME (distance measurement equipment) antenna, a NDB (non-directional beacon) antenna, and a ADF (automatic directional finder) antenna.

4. The data acquisition system for airborne navigation devices based on unmanned aerial vehicle according to claim 1, the power module adopts a lithium battery, a reference voltage provided is 28V DC voltage, and the voltage conversion module is 28V to 5V.

5. A data acquisition method for airborne navigation method based on unmanned aerial vehicle, comprising the following steps:

step 1: a multi-channel data processing module receives and processes navigation signals of ground navigation devices through a navigation devices test antenna array to obtain navigation devices data;

step 2: a signal acquisition module collects the navigation devices data, ADS-B data and differential positioning data to faun flight inspection data, and backs up the flight inspection data;

step 3: the signal acquisition module sends the flight inspection data to a unmanned aerial vehicle flight control system at the same time, and the unmanned aerial vehicle flight control system sends the flight inspection data to a ground station through a unmanned aerial vehicle data link;

step 4: the ground station sends multi-channel signal processing module switching instructions to the unmanned aerial vehicle flight control system;

step 5: the unmanned aerial vehicle flight control system sends the multi-channel signal processing module switching instructions to the signal acquisition module, switching of the multi-channel signal processing module is realized through the signal acquisition module, and a flight inspection of different navigation devices is completed;

step 6: when the unmanned aerial vehicle lands, the ADS-B transmitting module detects an aircraft landing signal and broadcasts the aircraft landing signal through ADS-B message, and ground station personnel receive the aircraft landing signal and complete a flight inspection process.

* * * * *